United States Patent Office

2,720,543
Patented Oct. 11, 1955

2,720,543

PROCESS OF IMPARTING ODOR-STABILITY TO GLYCOL THIOETHER BY ACIDIFYING AND SUBSEQUENTLY NEUTRALIZING OR PARTIALLY NEUTRALIZING

Willie W. Crouch and Rector P. Louthan, Bartlesville, Okla., assignors to Phillips Petroleum Company, a corporation of Delaware No Drawing. Application January 31, 1951,
Serial No. 208,854

10 Claims. (Cl. 260—609)

This invention relates to treatment of surface-active organic sulfur compounds. In one aspect it relates to the stabilization of a glycol thioether. In another aspect, it relates to the deodorization of a glycol thioether. In still another aspect, it relates to the deodorization and stabilization of a glycol thioether by treatment with an acid and subsequently separating an improved glycol thioether from the treated mass.

The glycol thioethers with which this invention is concerned are known in the art and, for the most part, can be represented by the formula $$RS(C_xH_{2x}O)_nH$$

in which R is an aliphatic hydrocarbon radical (usually an alkyl radical) containing from 8 to 16 carbon atoms, $x$ is an integer not less than 2 and, ordinarily, though not necessarily, not greater than 5, and $n$ is an integer from 6 to 16. These thioethers are prepared by condensing an aliphatic mercaptan having 8 to 16 carbon atoms per molecule with an alkene oxide, usually ethylene oxide, in the presence of an alkaline catalyst, such as a hydroxide or an alkoxide of an alkali metal. A solution of sodium hydroxide in methyl alcohol is a suitable catalyst. The condensation is ordinarily conducted at a temperature in the range of 180° to 300° F. One skilled in the art will recognize, from the foregoing brief description, the essential steps involved in the preparation of the said glycol thioethers.

It is well known that glycol thioethers prepared by the catalytic condensation of mercaptans with ethylene oxide, or its equivalent, are very useful as non-ionic surface-active agents or detergents. These materials have probably not been used extensively in the past because they have a tendency to develop a disagreeable odor when used in acidic media, e. g. dilute aqueous solutions of mineral acids such as sulfuric. Even though various precautions are taken in the preparation of these products, a disagreeable odor develops under acidic conditions. For example, the mercaptan which is employed can be purified prior to the condensation with the olefin oxide, and the final product can be separated from unreacted mercaptan and other odorous materials by steam stripping or the like, and yet, when these condensation products are employed in textile treating baths which are maintained acidic the resulting textile product will have a very disagreeable odor.

It has now been conceived that the odor-developing tendency of the glycol thioethers may be deliberately accelerated until exhausted or substantially depleted. It has been discovered that this effect may be accomplished by acidifying the condensation product to a pH not greater than about 3.0, then heating at a temperature in the range of 200° to 280° F., and, finally, removing the glycol thioether from the mixture thus obtained. This treatment results in increased stability and little or no odor development in the thioethers. A 10 per cent aqueous solution of the above condensation product (pH=3.0) will have a pH of 4.3.

Therefore, according to this invention, a process is provided by which glycol thioethers are stabilized and freed of odor-developing tendencies. The utility of the glycol thioethers for the purposes and uses previously mentioned is thus substantially increased, and difficulties previously attendant upon such uses are overcome.

In the first step of the stabilization process, the reaction mixture containing the glycol thioether and the alkaline condensing agent is acidified, preferably without cooling. A mineral acid such as sulfuric acid, hydrochloric acid, phosphoric acid, chlorosulfonic acid, fluorosulfonic acid and the like can be employed. It is desirable to avoid using such strongly oxidizing acids as nitric or perchloric. The acid is added to the reaction mixture as an aqueous solution having a concentration in the range of 1 to 30 weight per cent, preferably 5 to 25 per cent, and more preferably about 20 weight per cent. Halosulfonic acids will be substantially completely hydrolyzed in an aqueous solution of these concentrations. Sufficient acid is added to reduce the pH of the condensation product to a value of 3.0 or less. It has been found that it is necessary to reduce the pH to this range in order to provide the desired stabilization. The mere neutralization of the alkaline condensing agent, which is achieved by reducing the pH of the reaction mixture to a value of approximately 7, is not sufficient to provide a stable surface-active material. On the other hand, a large excess of acid is to be avoided. Although the benefits of the present invention can be realized by adding large amounts of acid, it is generally preferred to avoid bringing the pH to values substantially below about 0.7, since side reactions at lower pH values result in loss of product, especially during subsequent heating steps. A preferred pH range is therefore 0.7 to 3.0, and a more preferred range is 0.8 to 1.5. The quantity of acid required to reduce the pH to the desired range will usually be from about 0.02 to 1.0 gram of 100% acid per 100 grams of condensation product. Although good results are obtained by acidifying the glycol thioether after cooling to room temperature, this is less economical, since it is necessary to heat this acidified product in the second step of our procedure.

In the second step, the acidified glycol thioether is heated for a period of 5 to 100 minutes, preferably 10 to 60 minutes, at a temperature in the range of 200° to 280° F., preferably 230° to 240° F.

As a third step, following the heating, the treated glycol thioether is separated from lower-boiling impurities. The separation can be accomplished by fractional distillation, by pressure reduction, by stripping, or by other means known in the art for removing lower-boiling impurities. In one embodiment of the invention, the treated glycol thioether is subjected to a steam stripping operation to remove low-boiling impurities, particularly those with a disagreeable odor. The steam stripping can be carried out at atmospheric pressure at a temperature of 260° to 280° F. or, if desired, at a lower temperature and pressure, for example, at 10 to 100 mm. Hg at a temperature of 200° to 220° F. Other combinations of temperature and pressure which provide an equivalent stripping action may be employed if desired. This steam stripping is usually carried out for a period of approximately one hour, although somewhat longer times (e. g., 2 hours) or shorter times (e. g., 30 minutes) may be employed if desired. It is usually desirable to treat the product either before or after the stripping operation with sufficient alkali-metal hydroxide to increase the pH of the glycol thioether to a value in the range of 4 to 8. It is preferred to caustic-treat the heated product prior to steam stripping. It has been found satisfactory to use approximately 2 parts by weight of steam per part of thioether per hour in the stripping operation. Stripping agents other than steam (e. g. nitrogen, methane, etc.) may be used, or the stripping may be conducted without a stripping agent.

The mercaptan-ethylene oxide condensation products treated according to our procedure will not develop undesirable or disagreeable odors when employed in acid solutions or on standing for long periods of time. A test has been developed, and is discussed in the following examples, which provides a rapid and sensitive method, suitable for use on a laboratory scale, to measure the tendency of these condensation products to form odor when used as wetting agents in acid treating operations, for example in the textile industry. The following examples illustrate the improved stability resulting from our treatment as compared to the stability of the glycol thioethers treated by other methods.

EXAMPLE I

Ethylene oxide was catalytically condensed with tertiary dodecyl mercaptan (prepared by reaction of $H_2S$ with propylene tetramer) according to the following procedure, the catalyst employed being a 20 weight per cent solution of sodium hydroxide in methyl alcohol:

To 160 grams (0.79 mole) tertiary dodecyl mercaptan was added 5 cc. of the above catalyst, and the mixture was heated to 180° F. Ethylene oxide was then added, and the temperature of the reaction mixture gradually increased. The ethylene oxide was added at such a rate that the temperature was maintained as uniform as possible with the maximum not exceeding 265° F. A total of 314 grams (7.15 moles) of ethylene oxide was added over a period of 3.5 hours.

Two additional runs were carried out under similar conditions, and the three batches were combined.

A sample of 450 grams of the condensation product prepared above was neutralized to a pH of 7.0 by the addition of 5.25 cc. of 20 weight per cent sulfuric acid. An additional quantity of acid equivalent to 0.1 weight per cent of the thioether (2.25 cc. of 20 weight per cent sulfuric acid) was then added to reduce the pH of the sample to 0.9. The acidified material was heated for one hour at 230° to 240° F., cooled, and the pH adjusted to 8.0 by the addition of 1.40 cc. of 20 weight per cent sodium hydroxide. Samples of the untreated and acid-treated condensation product were steam stripped under various conditions indicated in Table I.

To determine the odor stability the stripped samples were subjected to the following test:

To a sample of each product was added 15 weight per cent water and 2 weight per cent sulfuric acid (100% acid) and this mixture allowed to stand for 24 hours at atmospheric temperature.

The odor of each sample was determined in a Fair-Wells Type B Osmoscope using air dilution. This type of odor measurment is described by Fair and Wells in the Journal of the American Waterworks Association, 26, No. 11, 1670-7 (1934). According to this test, the lower the odor number of a sample, the less intense is its odor.

with the dilute acid after steam stripping for one hour. In contrast, samples 3 and 4, which were treated in accordance with this invention developed odor numbers of only 2 and 1, respectively, when contacted with the dilute acid. The lower odor number in the case of sample 4 indicates that the reduced-pressure stripping produced better results, probably because of more nearly complete removal of impurities.

EXAMPLE II

A second batch of ethylene oxide-tertiary dodecyl mercaptan condensation product was prepared under conditions similar to those described in Example I. To a sample of 310.7 grams of this material, which had a pH of 10.3, was added 3.45 cc. of 20 weight per cent sulfuric acid which reduced the pH to 7.0. This sample was divided into two portions, one of which weighed 151.1 grams. This portion was treated with 3.8 cc. of 20 weight per cent sulfuric acid, which reduced the pH to 1.4.

Samples of the original and of the acid-treated condensation products were heated for one hour at 230° to 240° F. An 85-gram portion of each of these test samples were steam stripped for one hour at 210° to 220° F. and a pressure of 50 mm. Hg. The odor numbers were determined after the steam-stripping operation and again following the acid-treating test described in Example I.

*Table II*

| Sample | | pH | Odor Number | |
|---|---|---|---|---|
| No. | Description | | Stripped Product | Stripped Product After 24 Hours in 2% Acid |
| A | Control (Not acid treated) | 10.3 | 0 | 4 |
| B | Acid Treated | 7.0 | 0 | 5 |
| C | ------do------ | 1.4 | 0 | 2 |

It is thus shown conclusively that heating and steam stripping (sample A) and even neutralization to a pH of 7 (sample B) followed by heating and steam stripping, are inadequate to provide a glycol thioether type surface-active agent or detergent which will remain stable and free of disagreeable odors when used in acidic media or on long standing. Samples A and B developed the undesirably high odor numbers of 4 and 5, respectively, whereas sample C, which had been acidified to a pH of 1.4 in accordance with this invention developed an odor number of only 2.

Reasonable variation and modification are possible within the scope of the foregoing disclosure and the appended claims to the invention, the essence of which is that it has been found that a glycol thioether can be stabilized and freed of undesired odor-producing tendencies and that this can be accomplished by acidifying it to a pH not greater than 3.0, heating at 200° to 280° F.,

*Table I*

| Sample | | Steam Stripping Conditions | | | Odor Number | |
|---|---|---|---|---|---|---|
| No. | Description | Time (hours) | Temperature (° F.) | Pressure | Stripped Product | Stripped Product After 24 Hours in 2% Acid |
| 1 | Control (Untreated Reaction Product). | 1 | 212-220 | 1 atm | 0 | 4 |
| 2 | $H_2SO_4$ | 5 | 212-220 | 1 atm | 2 | 4 |
| 3 | $H_2SO_4$ | 1 | 260-270 | 1 atm | 0 | 2 |
| 4 | $H_2SO_4$ | 1 | 210-220 | 50 mm. Hg | 0 | 1 |

Sample No. 1, the untreated sample, developed the undesirably high odor number of 4 when contacted and stripping to remove low-boiling impurities as above described.

We claim:
1. A process which comprises acidifying a glycol thioether to a pH in the range 0.7 to 3.0, heating the acidified thioether for 10 to 60 minutes at a temperature in the range of 200° to 280° F., neutralizing to a pH in the range of 4 to 8, stripping the neutralized thioether at a temperature equivalent to 260° to 280° F. at 760 mm. Hg, and recovering a glycol thioether having substantially increased stability and a substantially decreased tendency toward odor development.

2. The process of claim 1 in which the acidification is conducted by the addition of a mineral acid selected from the group consisting of hydrochloric, fluorosulfonic, chlorosulfonic, sulfuric and phosphoric acids.

3. The process of claim 1 in which the acidification is conducted by adding an aqueous solution of a mineral acid having a concentration in the range of 1 to 30 weight per cent.

4. The process of claim 1 in which the stripping is conducted in the presence of steam.

5. In a process for producing a glycol thioether by condensing an aliphatic mercaptan having 8 to 16 carbon atoms per molecule with an alkene oxide at a temperature in the range of 180° to 300° F. in the presence of an alkaline catalyst selected from the group consisting of hydroxides and alkoxides of alkali metals, the improvement which comprises adding to the product of the condensation reaction an aqueous solution of a mineral acid selected from the group consisting of hydrochloric, sulfuric, fluorosulfonic, chlorosulfonic and phosphoric acids in a sufficient amount to decrease the pH to a value in the range of about 0.7 to 3.0, heating at 200° to 280° F. for 10 to 60 minutes, neutralizing to a pH of from 4 to 8, stripping with steam for 1 to 2 hours at 260° to 280° F., and recovering, as a product of the process, a glycol thioether having increased stability and a decreased tendency to develop an undesirable odor.

6. The process of claim 5 in which the condensation product comprises a compound having the formula

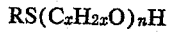

RS(C$_x$H$_{2x}$O)$_n$H in which R is an aliphatic hydrocarbon radical having 8 to 16 carbon atoms, $x$ is an integer from 2 to 5, and $n$ is an integer from 6 to 16.

7. The process of claim 5 in which the alkene oxide is ethylene oxide.

8. A process which comprises chemically reacting tertiary dodecyl mercaptan with a molar excess of ethylene oxide in the presence of a catalyst prepared by dissolving sodium hydroxide in methyl alcohol, maintaining a reaction temperature of 180° to 265° F., recovering a glycol thioether as a product of the reaction, said thioether having the characteristic of developing an undesirable odor on standing, adding to said thioether sufficient 5 to 25 per cent aqueous sulfuric acid to lower the pH to a value in the range of 0.8 to 1.5, heating for 10 to 60 minutes at a temperature in the range of 230° to 240° F., adding sufficient aqueous sodium hydroxide to increase the pH to a value in the range of 4 to 8, stripping for a period of time in the range of 30 minutes to 2 hours in the presence of steam at a temperature of 200° to 220° F. and a pressure of 10 to 100 mm. Hg, and recovering an improved thioether having a substantially decreased tendency to develop an undesirable odor on standing.

9. A process which comprises adding, over a period of 3.5 hours, to a mixture of tertiary dodecyl mercaptan and a 20 weight per cent solution of sodium hydroxide in methyl alcohol, 9 moles of ethylene oxide per mole of mercaptan, maintaining a temperature in the range of 180° to 265° F. during said addition, adding to the condensation product sufficient 20 per cent aqueous sulfuric acid to lower the pH to 0.9, heating for 1 hour at 230° to 240° F., adding sufficient 20 per cent aqueous sodium hydroxide to increase the pH to 8.0, stripping for 1 hour in the presence of steam at 210° to 220° F. and 50 mm. Hg, and recovering said condensation product.

10. A process which comprises adding over a period of 3.5 hours, to a mixture of tertiary dodecyl mercaptan and a 20 weight percent solution of sodium hydroxide in methyl alcohol, 9 moles of ethylene oxide per mole of mercaptan, maintaining a temperature in the range of 180° to 265° F. during said addition, adding to the condensation product sufficient 20 per cent aqueous sulfuric acid to lower the pH to 1.4, heating for 1 hour at 230° to 240° F., stripping for 1 hour in the presence of steam at 210° to 220° F. and a pressure of 50 mm. Hg and recovering said treated condensation product.

References Cited in the file of this patent
UNITED STATES PATENTS 2,494,610    Davidson et al. _____ Jan. 17, 1950